July 31, 1956 — G. H. SKOG — 2,756,641
GEAR WORM THREAD GENERATING MACHINE
Filed Aug. 21, 1952 — 3 Sheets-Sheet 1
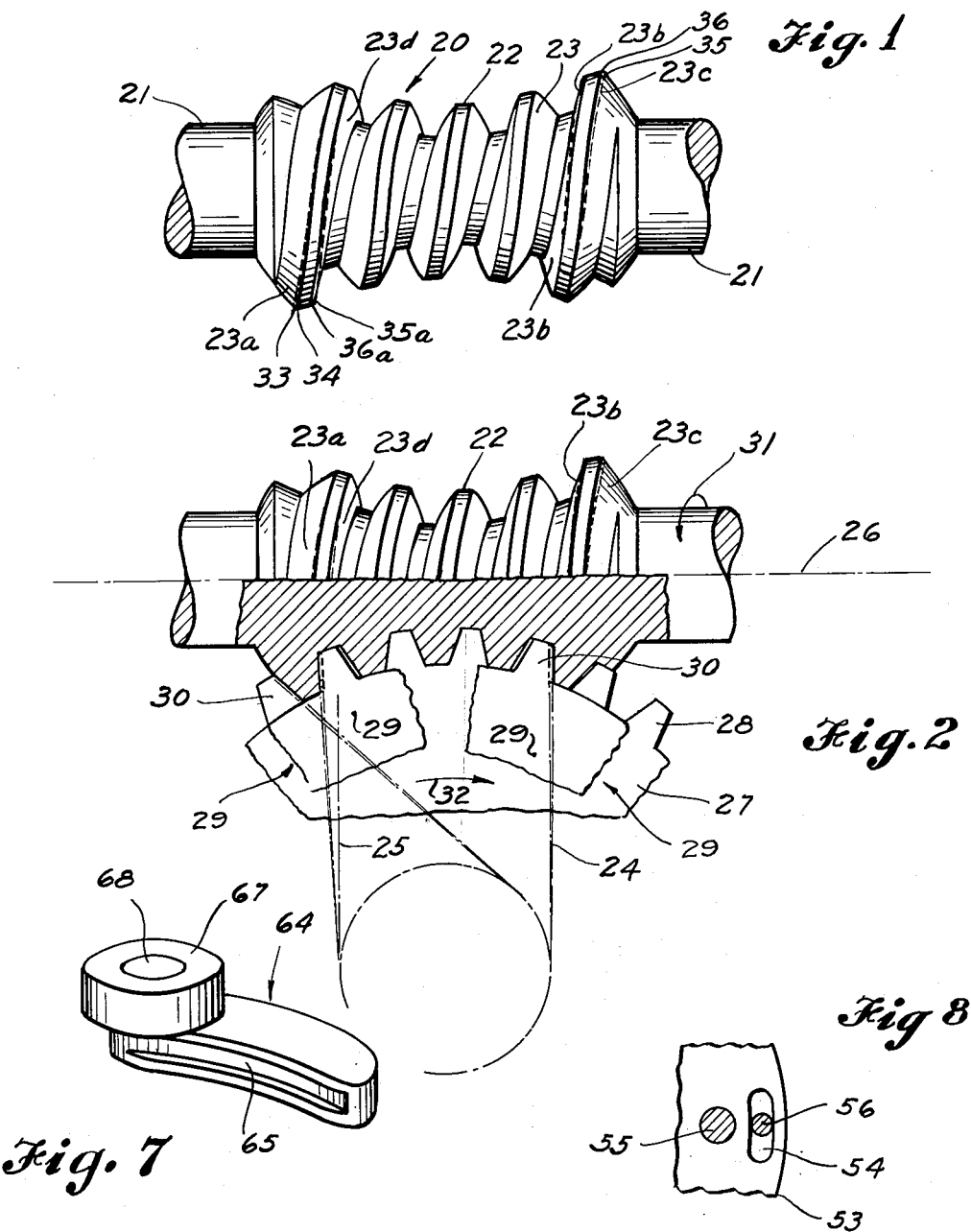
INVENTOR.
Graham H. Skog July 31, 1956

G. H. SKOG 2,756,641

GEAR WORM THREAD GENERATING MACHINE

Filed Aug. 21, 1952

INVENTOR.

Graham H. Skog

July 31, 1956  G. H. SKOG  2,756,641
GEAR WORM THREAD GENERATING MACHINE
Filed Aug. 21, 1952  3 Sheets-Sheet 3

INVENTOR.
Graham H. Skog

United States Patent Office 2,756,641
Patented July 31, 1956

2,756,641

GEAR WORM THREAD GENERATING MACHINE

Graham H. Skog, Edmonds, Wash.

Application August 21, 1952, Serial No. 305,528

12 Claims. (Cl. 90—3)

My invention relates to cutting and finishing gear worms of the globoidal (sometimes known as the Hindley, Cone or Scott) type, and particularly to relieving the worm thread extensions and ends for full bearing alignment and envelopment with complementary worm gear teeth in helical worm gearing combinations of the type in which over-all axial length of the worm threads extend beyond the tangents of the mating helical worm gear teeth flanks, and the worm threads within the diameter of the circle to which said gear tooth flanks are tangent require, for a substantial distance inwardly from said tangents, relief in order to provide smooth, full bearing between the worm and worm wheel when operating under load, and acute relief on thread extensions outward from beyond said circle for strength and support of bearing portions.

The present practice and gear generating machines using a single disc edge cutting tool of a fixed diameter with fixed teeth into which the worm blank is gradually fed to a predetermined depth, where at this point the single edge cutting tool during several complete revolutions gradually moves out of line with its former position or timing, producing a side feed to true up the flanks of the thread, do not accomplish the required relief to finish the thread extensions but rather leaves them thick, making additional operations, including handwork, necessary. The axial end (extensions of the) thread flanks now require special relief either in an endmilling machine with subsequent hand-work to finish, or filing and finishing by hand entirely. Hand-work is costly, is not dependably uniform (depending upon experience and skill of workmen using file, abrasive disk or wheel), and withal involves time loss in production.

The present machinery and practice using an edge cutting tool of pitch diameter greater than that of the mating worm gear teeth to cut gear worm threads does not give the desired relief necessary on the thread ends for full bearing under load, but results in only partial relief gradually increasing each way from the central point to the thread ends.

It is the object of my invention to eliminate the supplemental machine and hand work required in presently existing machines to finish worm gear pinions of the type described. Another object of my invention is to eliminate the previously required handwork, inaccuracies and time loss involved in present generating processes to finish such worm gear pinions. Still another object of my invention is to provide an automatic machine process to secure accurate and uniform relief of the end portions of worm threads and thread extensions as required in worm pinions of the type described. A further object of my invention is to generate the required worm gear pinion of the type described and automatically relieve and finish the thread ends and thread extensions in one complete operation.

With these and other objects in view, my invention comprises the generating of the worm of the type described completed with threads, thread ends and extensions properly relieved and finished in one operation, which is described and set forth in the following specifications and illustrated in the accompanying drawings. In the accompanying drawings annexed hereto I have shown my invention embodied in one form to generate a single threaded worm, but it can be made to produce a multiple threaded worm. It will be understood that the invention can be otherwise embodied and that the drawings are not to be construed as defining or limiting the scope of the invention, the claims appended to this specification being relied on for this purpose.

Fig. 1 is an elevational view of the finished worm with dotted lines at the ends of the thread indicating the portion of the flank of the thread to be removed by my cutter.

Fig. 2 is an elevation of the worm partly in section with a general cutter performing the finishing cut, and with fragmentary views of my cutter in two different positions removing the flank of the thread as indicated by the dotted lines Fig. 1.

Fig. 7 is an enlarged perspective of the cam roller holder.

Fig. 8 is a fragmental detail of parts associated with the cutter adjusting means.

Figure 3:
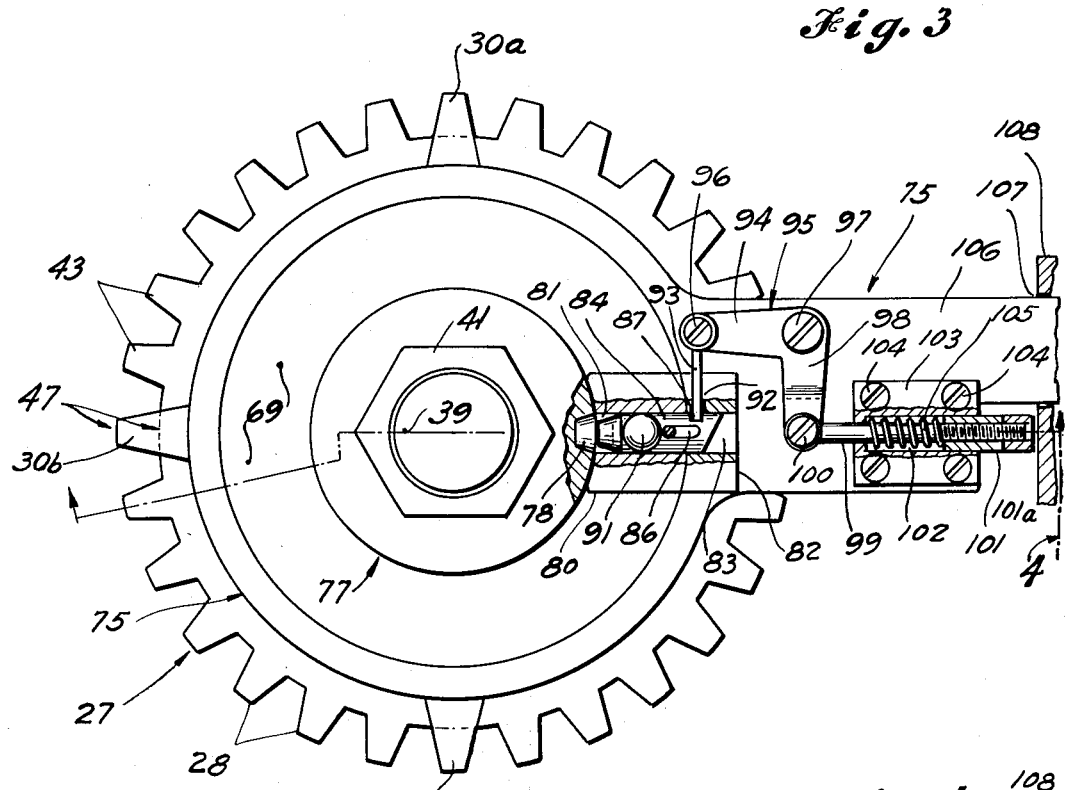
Fig. 3 is a top view (with parts broken away) of a regular worm cutter with my cutter attached and including necessary equipment attached thereto.

Referring more particularly to the drawings reference numeral 20 represents a single thread worm, formed as an integral part of the worm shaft 21. The worm consists of a thread 22 with flanks 23.

In generating the worm, a worm blank is first set up in the gear generating machine and a cutter having the same number of teeth as that of the gear that the worm is to co-act with, is fed into the worm and the relative speed between the worm and the cutter is the same as that of the finished gear and worm.

The effective or working length of the worm is the extreme length that the flank surface of the thread of the worm come in contact with the mating flanks of the worm gear and is equal to the distance between the positions where any pair of opposed flanks of the worm thread form right angles with the axes of the worm. Referring to Fig. 2 this working distance is equal to the distance between the two lines 24 and 25 where it will be noted that the line 24 forms a right angle with the axis 26 of the worm and lies in the flank of the thread. Line 25 is also perpendicular to the axis 26 of the worm and will pass through the flank of the thread when the worm has rotated a fraction of a revolution in the direction indicated.

To stop the threads at lines 24 and 25 would very materially weaken the thread due to it terminating in a feather edge. It is therefore customary to extend the thread for some distance at each end of the worm for added strength.

Extending the thread of the worm past the lines 24 and 25 (Fig. 2) with an effort to keep the flanks of the thread of the worm in contact with the flanks of the gear teeth will result in serious interference between the thread of the worm and the teeth of the gear. It is therefore necessary to remove a portion of the flank past these lines as indicated between the solid and dotted lines in Fig. 1. In practice it is generally desirable to start removing the flanks of the thread slightly in advance of the lines 24 and 25 to give full bearing under load. It is this removing of the flank that I accomplish by my auxiliary cutter.

I accomplish this by removing certain cutter teeth of the general cutter and interposing auxiliary cutter teeth in their place that may be rotatedly moved with respect to the teeth of the general cutter. Referring to Fig. 2 numeral 27 represents the general cutter of which 28 are the teeth, 29 represents my auxiliary cutter of which 30, 30a, 30b and 30c are the teeth.

In the practice of generating the worm, the worm blank which is secured in the worm arbor of the gear generating machine is rotated in the direction of arrow 31 and the thread generating tool is rotated in a direction of the arrow 32 as it is being fed into the worm. Fig. 2 shows the worm and the tool in the position they occupy when the worm is almost completed.

In the process of cutting the worm as the flank 23a Fig. 1 of the worm comes in contact with the cutter, the tooth 30 of my auxiliary cutter 29 is advanced in a clockwise direction in respect to the teeth of the general cutter 27 permitting a heavier cut on the flank 23a of the worm removing the metal between the dotted line 33 and the solid line 34, Fig. 1.

In the present application when the worm cutter has rotatably advanced approximately five teeth in the direction of the arrow 32 the auxiliary tooth is oscillated slightly in a counterclockwise direction with respect to the rotation of the general cutter causing a heavier cut on the flank 23c of the worm thread 22 removing extra metal as indicated between dotted line 35 and solid line 36 in Fig. 1.

In a similar manner when the cutter has advanced a few more teeth the next tooth of my auxiliary cutter will be removing extra metal from the flank 23d or as indicated between dotted line 35a and solid line 36a, and when the cutter 27 has advanced approximately three teeth in the direction indicated this auxiliary tooth will be removing extra metal from the opposing flank as shown at 23b. The next tooth of my auxiliary cutter will repeat the first operation described and fourth auxiliary tooth the second operation described which completes one cycle in the present set up.

Figure 4:
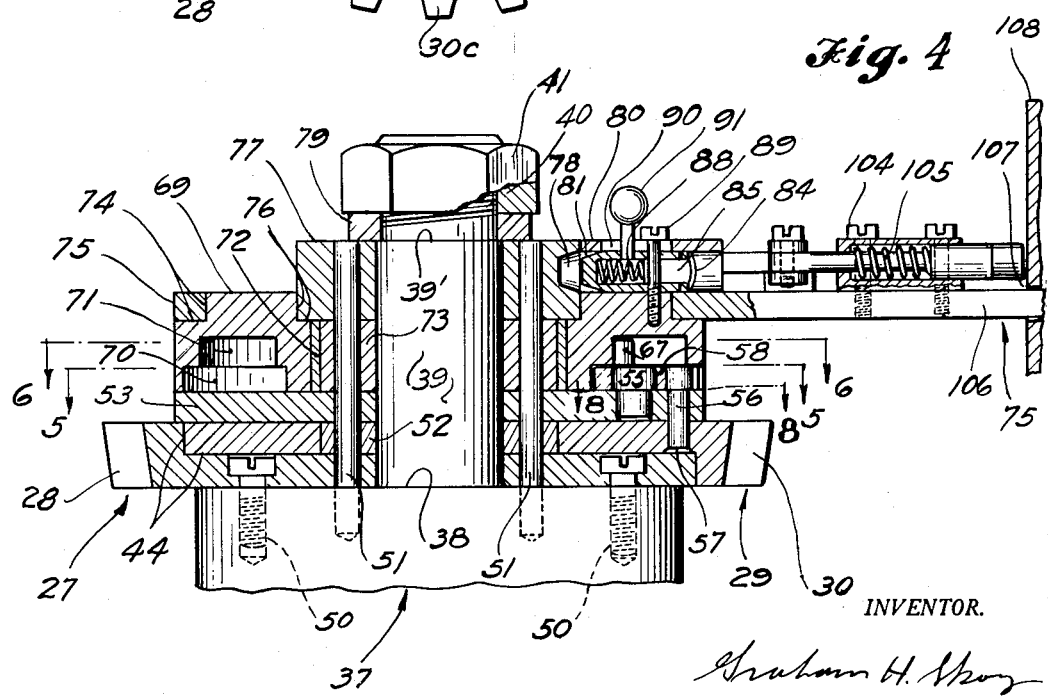
Fig. 4 is a sectional view taken upon a line 4—4 of Fig. 3.

The construction and operation of my auxiliary cutter will now be more fully described. Referring to Fig. 4 reference numeral 37 represents the arbor to which the worm cutter is secured, 38 is the bed of the arbor and 39 a projecting hub of the arbor, the top of which is provided with a thread 40 and a clamping nut 41.

The general cutter is represented in its entirety by reference numeral 27 of which 28 are the thread generating teeth of the cutter. The general cutter is counterbored as shown at 44 to receive my auxiliary cutter which is represented in its entirety by reference numeral 29. In the present application four teeth spaced at 90° on the general cutter are omitted as indicated in position 47, and in their places I provide teeth 30, 30a, 30b and 30c of my auxiliary cutter 29. The general cutter 27 is securely held in place on arbor 37 by means of screws 50 (Fig. 4) and rotationally secured by means of dowels 51, a bushing 52 about which the auxiliary cutter 46 is free to oscillate. Slipped over the projecting hub 39 and dowels 51 is a plate 53. Plate 53 is provided with an elongated hole 54 arcuately curved about the arbor axis as seen in Fig. 8. Secured in plate 53 is a shoulder pin 55 (Figs. 4—5—6—8). Passing through elongated hole 54 is a shoulder pin 56, the lower end of which is secured in the auxiliary cutter 29 as shown at 57 (Fig. 4).

Figure 5:
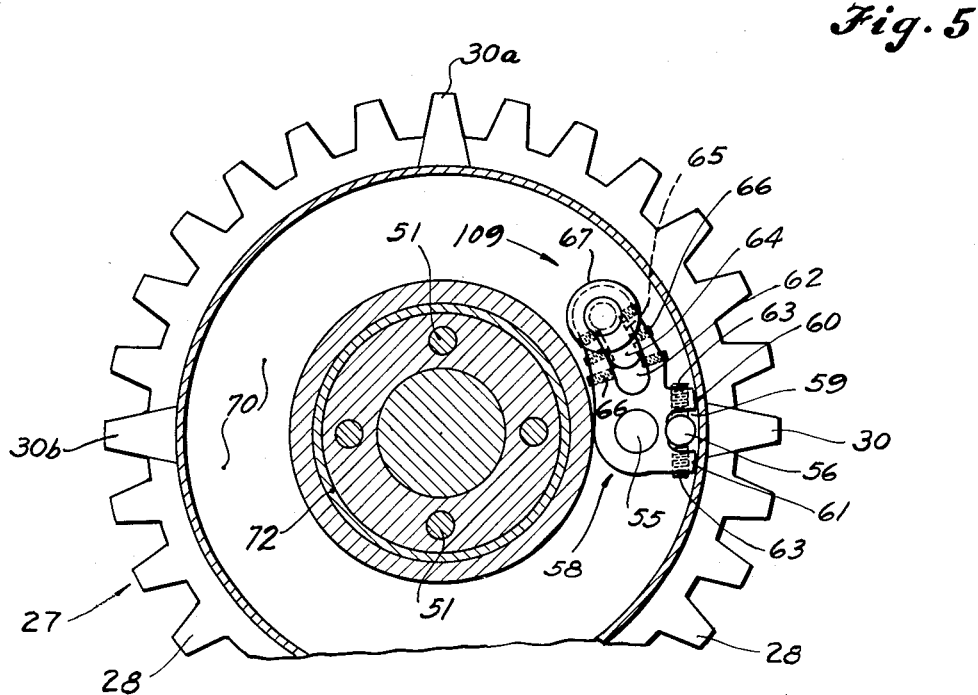
Fig. 5 is a section taken upon the line 5—5 of Fig. 4.
Figure 6:
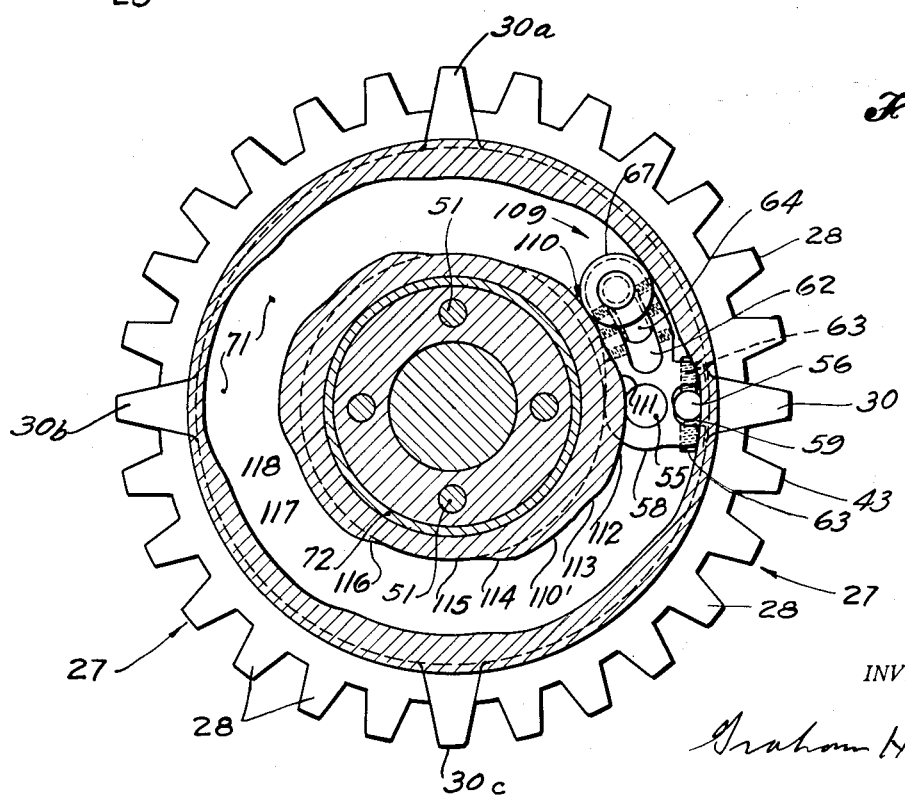
Fig. 6 is a sectional view taken upon the line 6—6 of Fig. 4.

Slipped over shoulder pin 55 and free to oscillate thereon is a bell crank 58 (Figs. 4—5—6). One arm of the bell crank 58 extends radially of the cutter disk and is forked as shown at 59, leaving two prongs 60 and 61. The other arm of the bell crank extends laterally thereof and is formed with a longitudinal slot 62. The prongs 60 and 61 are provided with flat point set screws 63, to adjust the position of the fork and the bell crank with respect to pin 56. The set screws 63 are set to touch the shoulder pin 56 but free enough to allow for a slight oscillation. Slidably mounted in slot 62 is a cam follower holder 64 (Figs. 5—6—7). The cam follower holder 64 is provided with grooves 65, one being on the opposite edge to that shown. The cam follower holder is properly positioned in slot 62 and firmly clamped in place by means of dog point set screws 66. The dog points of the set screws engaging in the grooves 65 will prevent the cam follower holder from lifting out of the slot 62 as well as keeping it from sliding therein. To one end of the cam follower holder 64 is mounted a cam follower roller 67 by means of pin 68.

From Fig. 4 it will be noted that plate 53 is rotationally fixed with respect to the general cutter 27 so that any oscillation of the roller end of the bell crank 58 about its pivot pin 55 will cause the shoulder pin 56 and the auxiliary cutter 29 to which it is secured to oscillate with respect to the general cutter 27.

Reference numeral 69 represents an annular cam in its entirety of which 70 is a counterbore and 71 the cam groove (Figs. 3—4—5—6). The cam follower 67 engages in cam groove 71, so as it moves therein it will cause the bell crank 58 to oscillate about pin 55 causing the auxiliary cutter 29 to oscillate with respect to general cutter 27 as previously described. Cam 69 is rotatably fitted about bushing 72 pressed on to spacer block 73. The top and outer edge of cam 69 is turned down as shown at 74 to receive a bored out plate 75 in which it is free to rotate. The upper and inner edge of cam 69 is counterbored as shown at 76 to receive a circular block 77 around which it is free to rotate. The circular block 77 it will be noted is rotatedly fixed with respect to hub 39 and arbor 37 by means of dowels 51. The circular block 77 is provided with a cone shaped hole 78 (Figs. 3—4). The entire unit thus far described is held in place by means of collar 79 clamped against shoulder 39' by means of nut 41.

The top surface of the cam is provided with a boss 80 which is bored as at 81 and the plate 75 is provided with a boss 82 which is bored as shown at 83. The bores 81 and 83 are of like diameters.

Adapted to slide in bores 81 and 83 is a plunger 84. The plunger 84 is longitudinally bored as shown at 85 and is provided with an elongated hole 86 and a notch 87. In the bore 85 of the plunger is slipped a spring 88 which is retained by means of screw 89 so that the spring will urge the plunger 84 to the left unless otherwise retained. Passing through an elongated hole 90 and the boss 80 is a round headed pin 91 the lower end of which is firmly fixed in the plunger 84 (Fig. 4) to manually reset the plunger when it has been forced to the left into the cone shaped hole 78 due to spring 88. Passing through an aperture 92 of the boss 82 is a sliding bar 93 the inner end of which is adapted to engage in the notch 87 of the plunger 84 and the outer end is pivoted to an arm 94 of a bell crank 95 by means of pivot screw 96. The bell crank 95 is pivoted to the plate 75 by means of shoulder screw 97. To the other arm 98 of the bell crank 95 is pivoted an eye bolt 99 by means of screw 100. The other end of the eye bolt 99 is provided with a circular adjusting nut 101 and lock nut 101a which is free to slide in the shoulder bore 102 of a block 103, secured to the plate 75 by means of screws 104. Disposed between the shoulder of the shoulder bore 102 and the nut 101 is a spring 105 which as will be noted tends to urge the nut 101 and 101a and the eye bolt 99 toward the right.

Any pressure toward the left of the nut 101a will slide the eye bolt 99, which in turn will rock the bell crank 98 so as to release the sliding bar 93 from the notch 87 of the plunger 84 which will now be forced to the left, the cone point of which will engage the cone shaped hole 78 in circular block 77 or against the outer surface of the block until it is turned till the cone shaped hole 78 registers with the cone point of the plunger 84. Integral with the plate 75 is a projecting rectangular bar 106 which is adapted to slide in a rectangular aperture 107 of the casting 108 which forms part of the frame work of the gear generating machine.

The method of operation is as follows:

The worm blank is first clamped into the worm arbor of the worm gear generating machine and my thread generating cutter secured to the cutter arbor of the machine as previously described. Before starting machine the cutter is arranged so that it is just clear of the worm blank and the rotational position of the cutter so adjusted that an auxiliary cutter tooth will just commence cutting the end of the worm thread at the proper position. The cam is also adjusted so that it will be locked in the position shown in Figs. 3-4 by means of the plunger 84 engaging in both bores 81 and 83 of the bosses 80 and 82 respectively. The plunger is held in this position by means of the sliding bar 93 engaging in notch 87 of the plunger 84. The machine is now set in operation the relative speed between the worm and the worm cutter being the same as that of the worm and the worm gear with which it is to mesh. All this is taken care of in the internal gearing of the gear generating machine. As the machine is set into operation the cutter is fed into the blank until the worm thread is generated. As the cutter arbor 37 is rotating the bell crank 58 will rotate with it due to pivot pin 55 which is secured in the plate 53 which rotates with the general cutter 27 as previously described. The rotation of the cutter and the bell crank 58 is in the direction of the arrow 109 (Figs. 5, 6). With the position of the cutter, the cam, and the follower in the position shown in the drawings— as the cam roller 67 rides from the dwell 110 in the cam groove 71 on the lobe 111, on to the dwell 112 the auxiliary cutting tooth 30 will be urged to the right with respect to the general cutter 27 causing extra metal to be removed from the flank 23b of the worm thread 22 as shown in Figs. 1, 2. As the cam roller continues to ride on the dwell 112 the auxiliary cutter being slightly advanced the auxiliary cutting tooth 30a when it comes in contact with the worm thread 22 will remove extra metal from the flank 23a, as indicated between the dotted line 33 and the solid line 34, Figs. 1, 2. As the roller rides down the lobe 113 of the cam onto the dwell 110' the auxiliary cutter will be in neutral and its teeth evenly spaced with the regular cutter and no extra metal will be removed. As the cam roller rides down the lobe 114 of the cam on to the dwell 115 the auxiliary cutter will be retarded with respect to the regular cutter and the auxiliary tooth 30a will remove extra metal from the flank 23c of the worm thread as shown between the dotted line 35 and the solid line 36, Figs. 1, 2. As the cam roller continues to ride on the dwell 115 the auxiliary cutter will come in contact with the worm thread flange at 35a and thus remove extra metal and complete one cycle of cutting extra metal from the ends of the worm thread. When the cam roller rides up on the lobe 116 on to the dwell 117 the auxiliary cutter will again be restored to neutral. The next half revolution will again repeat the cycle, with the tooth 30b of the auxiliary cutter removing the metal that the tooth 30 previously did and the tooth 30c removing the metal that the tooth 30a previously removed. While I have shown and described the method for removing the extra metal from the ends of a single thread worm it will be apparent that to remove the metal from a double or three thread worm it may be accomplished in a similar manner by changing the number of teeth on the auxiliary cutter and by replacing the present cam with another cam of a different contour.

The amount of metal to be removed from the ends of the thread may be varied by changing the position of the cam roller holder 64 in the slot 62.

When the cutting of the worm is nearly completed and the cutter is advanced into the worm to approximately the position shown in Fig. 2 the nut 101a, Figs. 3, 4, of the eye bolt 99 will strike the frame work 108 of the gear generating machine, tripping the bell crank 94, releasing the sliding bar 93 from the notch 87 of the plunger 84 permitting it to be released, its cone point engaging in the cone shaped hole 78 of the circular block 77 thus locking the cam in a fixed position with respect to the arbors and the cutters causing it to rotate with the cutter. When the cam is in this locked position the teeth of my auxiliary cutter will be uniformly spaced with respect to the teeth of the general cutter and no metal will now be removed from the ends of the worm while the finishing of the worm is being performed. This is referred to as the neutral or normal position of the teeth of the auxiliary cutter.

The closer the cam roller holder is moved toward the shoulder pin 55 the less the relative movement of the auxiliary cutter will be to that of the regular cutter, consequently removing less metal from the flanks at the ends of the thread. This is desirable in a double or three thread worm. The exact spacing of the teeth of the auxiliary cutter with that of the regular cutter is accomplished by that of set screws 63.

While I have shown a particular form of construction of my device I am well aware that many changes may suggest themselves such as the exact construction of the cutter that I have shown without departing from the spirit and scope of my invention and therefore do not wish to be limited to the particular form of embodiment shown.

Having thus described my invention, what I claim as new and desire to secure by Letters Patent, is:

1. In an apparatus for generating gear worms with extended threads; said apparatus including means for holding a worm blank, a thread generating tool associated with the blank holding means and means for causing rotation of the blank holding means and tool in predetermined timing for the generation of the worm; said tool comprising an axially rotatable body equipped with double edged cutters at uniform angular spacing as required for the generation of the worm thread; a double edged cutter mounted on said body in a normal position at which it cooperates with said double edged cutters in the generation of said worm thread and movable on the body for angular advancement and recession from the normal position, and means operable to effect controlled advancing and receding movements of the movable cutter in timing with the rotative advancement of the tool to effect a controlled trimming thereby of the opposite sides of the flanks of the extended threads.

2. In an apparatus for generating worms with extended threads; said apparatus including means for holding a worm blank, a thread generating tool associated with the blank holding means, and means for causing rotation of the blank holding means and said tool in predetermined timing for the generation of the worm; said tool comprising a circular, axially rotatable body equipped with double edged cutters in uniform angular spacing as required for the generation of the worm thread, first and second double edged cutters movably mounted on said rotatable body in angular spacing and adapted, when at a normal position thereon to cooperate with the first mentioned cutters for the generation of the worm thread, and adapted for angular advancement and recession from said normal position and means operable incident to the turning of the tool to effect a controlled advancement of the first of said movable cutters, to position it for trimming, as it approaches one end of the worm, one face of the flank of the extended thread and to set the other movable cutter in position for trimming as it enters the worm, the opposite face of the extended thread, then to effect a controlled receding movement of said cutters whereby their relationship to the thread flanks is reversed.

3. In apparatus for generating gear worms with extended threads requiring relief for full throated enmeshment with gear wheels of the globoidal type, said apparatus comprising means for holding a worm blank, a thread generating tool associated therewith, a supporting base drive for the tool and means for causing rotation of the blank holding means and the said base drive and tool in predetermined timing for the generation of the worm thread; said thread generating tool comprising separate rotatable and oscillatable circular double edged cutting tool elements, means for rotating the said elements and oscillating one of them relative to the other in predetermined time and position relationship to the blank supporting means; said rotating and oscillating means comprising interrelated mechanical devices for adjusting the relative position of the individual tool element cutting edges; and said positioning devices having interrelated actuation from both the base drive and a fixed cam independent of the base drive.

4. In a gear worm generating mechanism of the character disclosed comprising, in combination, a stationary frame member, means for axially rotating a worm blank and a thread generating tool coacting therewith for the formation of a worm thread; said tool comprising an axial support rotating in predetermined timing with the blank rotating means, an arbor extending coaxially from the said support, a general cutter disk fixedly mounted on said support coaxial of the arbor, an auxiliary cutter disk coaxial of the arbor and rotatably adjustable thereon relative to the general cutter disk; said general cutter disk and said auxiliary cutter disk having angularly spaced edge cutters disposed thereon to follow in the same plane and same cutting circle and interspaced to cooperate in generating a worm thread on the worm blank, a plate mounted on and rotatable with the arbor, a cam disk passing the arbor rotatably therethrough, said cam disk having a continuous cam groove therein encircling the arbor, means fixed relative to the said frame member for holding the cam against rotation, a lever pivoted on said plate, a follower on said lever disposed to follow in the cam groove as the plate rotates with the arbor, means operatively connecting the lever with the auxiliary cutter disk to effect its rotation with the plate and the general cutter disk; said cam groove being designed to effect oscillating movements of the lever as the plate rotates, to produce, through the connection between lever and auxiliary cutter disk, controlled advancing and receding adjustments of the auxiliary cutter disk relative to the general cutter disk whereby the cutters of the auxiliary disk will be positioned to effect controlled trimming of the flanks of the extended threads of the generated worm thread.

5. A mechanism as recited in claim 4 wherein the means for holding the cam against rotation comprises a member mounted on the cam that is movable from holding position to a position whereby the cam is locked to and caused to rotate with the arbor.

6. A mechanism as recited in claim 4 wherein the said means for holding the cam against rotation comprises a plate supported by the arbor and held against rotation by connection with the frame member, a latch bolt movably mounted on said cam and adjustable to one position to engage with the said plate thus to hold the cam against rotation, or to another position whereby it is engaged with the arbor to cause the cam to rotate with said cutters, and the cutters of the auxiliary cutter disk to be locked in normal relationship to the cutters of the general cutter disk.

7. Mechanism as recited in claim 6 including also latch mechanism for holding the bolt in position locked with the cam, a spring for urging the bolt to its other position when released by said latch mechanism, and means associated with the frame member for tripping said latch mechanism to release the latch bolt when the cutters have advanced a predetermined distance into the worm blank.

8. In a gear worm generating mechanism of the character disclosed comprising, in combination, a stationary frame member, means for axially rotating a worm blank and thread generating tool coacting therewith for the formation of a worm thread; said tool comprising an axial support rotating in predetermined timing with the blank rotating means, an arbor extending coaxially from the said support, a general cutter disk fixedly mounted on said support coaxial of the arbor, an auxiliary cutter disk coaxial of the arbor and rotatably adjustable thereon relative to the general cutter disk; said general cutter disk and said auxiliary cutter disk having angularly spaced edge cutters disposed thereon to follow in the same plane and same cutting circle and interspaced to cooperate in generating a worm thread on the worm blank, a plate mounted on and rotatable with the arbor, a cam disk passing the arbor rotatably therethrough, said cam disk having a continuous cam groove therein encircling the arbor, means fixed relative to the said frame member for holding the cam against rotation, a lever pivoted on said plate, a follower on said lever disposed to follow in the cam groove as the plate rotates with the arbor, means operatively connecting the lever with the auxiliary cutter disk to effect its rotation with the plate and the general cutter disk; said cam groove being designed to effect oscillating movements of the lever as the plate rotates, to produce, through the connection between lever and auxiliary cutter disk, controlled advancing and receding adjustments of the auxiliary cutter disk relative to the general cutter disk whereby the cutters of the auxiliary disk will be positioned to effect controlled trimming of the flanks of the extended threads of the generated worm thread; said lever being of bell crank form with one arm extended along the cam groove and mounting the said cam follower thereon, and the other arm extending in a direction radially of the cutter and connected at its outer end with the auxiliary cutter disk to effect its rotation with the general cutter disk and its oscillating adjustments relative thereto.

9. Apparatus as in claim 8 wherein the cam follower is adjustable along the arm of the bell crank on which it is mounted to increase or decrease the effective movement of the other arm.

10. In a gear worm generating mechanism of the character disclosed comprising, in combination, a stationary frame member, means for axially rotating a worm blank and a thread generating tool coacting therewith for the formation of a worm thread; said tool comprising an axial support rotating in predetermined timing with the blank rotating means, an arbor extending coaxially from the said support, a general cutter disk fixedly mounted on said support coaxial of the arbor, an auxiliary cutter disk counter sunk in the general cutter disk coaxial of the arbor and rotatably adjustable thereon relative to the general cutter disk; said general cutter disk and said auxiliary cutter disk having angularly spaced edge cutters disposed thereon to follow in the same plane and same cutting circle and interspaced to cooperate in generating a worm thread on the worm blank, a plate overlying said cutter disks and mounted on and rotatable with the arbor, a cam disk overlying the said plate and passing the arbor rotatably therethrough; said cam disk having a continuous cam groove therein encircling the arbor, a plate, overlying the cam and passing the arbor therethrough and having a connection with the frame member to prevent its rotation, means on the plate for holding the cam against rotation and releasably therefrom to permit its rotation, a lever pivoted on the first mentioned plate, a follower on said lever disposed to follow in the cam groove as the lever mounting plate rotates with the arbor, means operatively connecting the lever with the auxiliary cutter disk to effect its rotation with the general cutter disk; said cam groove being designed to effect oscillating movements of the lever as the plate rotates, to produce, through the connection between lever and auxiliary cutter disk, controlled advancing and receding adjustments of the auxiliary cutter disk relative to the general cutter disk whereby the cutters of the auxiliary disk will be positioned to effect controlled trimming of the flanks of the extended threads of the generated worm thread.

11. An apparatus as recited in claim 10 wherein the said lever is a bell crank lever, with one arm extended along the cam groove and its other arm directed substantially radially of the cutter, and wherein said cam follower is mounted on the first mentioned arm for adjustment therealong to change the extent of oscillation of the second arm as effected by the cam, and said second arm has an operative connection with the auxiliary cutter for its rotation and oscillation.

12. In an apparatus for generating gear worms with extended threads; said apparatus including means for holding a worm blank, a thread generating tool associated with the blank holding means and means for causing rotation of the blank holding means and said tool in predetermined timing for the generation of the worm; said tool comprising a circular axially rotatable body with cutters set in uniform, angular spacing as required for the generation of the worm thread, some of said cutters, spaced at even intervals being double edged and movably mounted on the body for advancement and recession from normal setting in unison, and being arranged to functionally engage the worm successively one at a time, and means operable incident to the turning of the tool to effect a controlled movement of each movable cutter as it enters the worm, to trim one face of the flank of the extended thread, at that end, and to effect a controlled movement of the said cutter as it is leaving the worm, to trim the opposite flank of the extended thread at that end of the worm, and by these controlled movements to cause successive movable cutters in passing through the worm to trim opposite flanks of the thread extensions.

References Cited in the file of this patent

UNITED STATES PATENTS

| | | |
|---|---|---|
| 1,128,613 | Lanchester | Feb. 16, 1915 |
| 1,751,540 | Cone | Mar. 25, 1930 |
| 2,052,804 | Scott | Sept. 1, 1936 |
| 2,153,898 | Scott | Apr. 11, 1939 |
| 2,348,845 | Pelphrey | May 16, 1944 |
| 2,616,336 | Holstein | Nov. 4, 1952 |
| 2,620,709 | Wildhaber et al. | Dec. 9, 1952 |